March 5, 1968     J. E. WHITE     3,371,431
VOCABULARY AND SPELLING GAME DEVICE
Filed Feb. 25, 1965     2 Sheets-Sheet 1
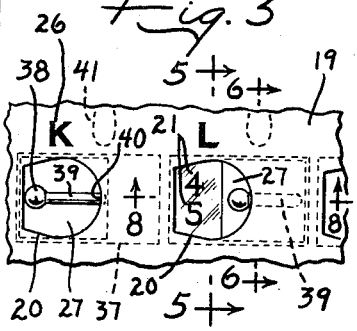
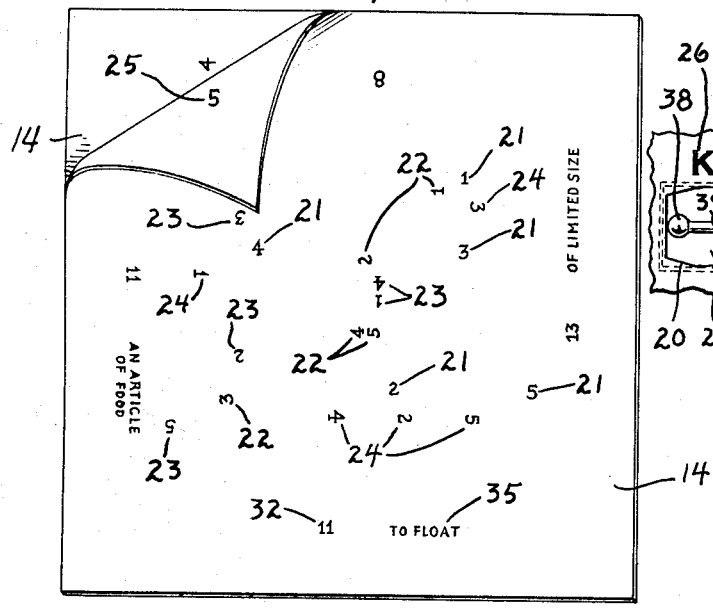
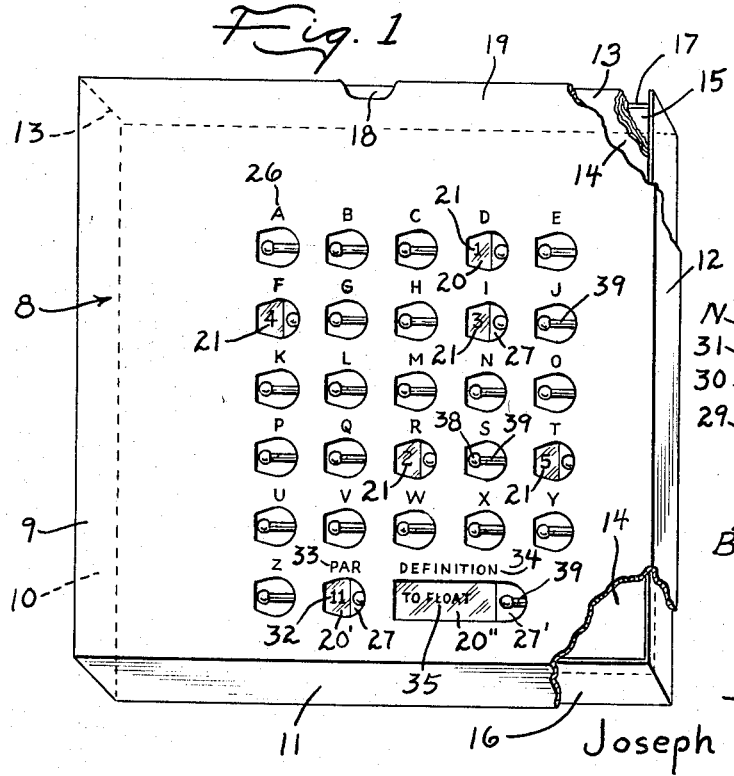
Inventor
Joseph E. White
Attorney March 5, 1968 J. E. WHITE 3,371,431
VOCABULARY AND SPELLING GAME DEVICE
Filed Feb. 25, 1965 2 Sheets-Sheet 2
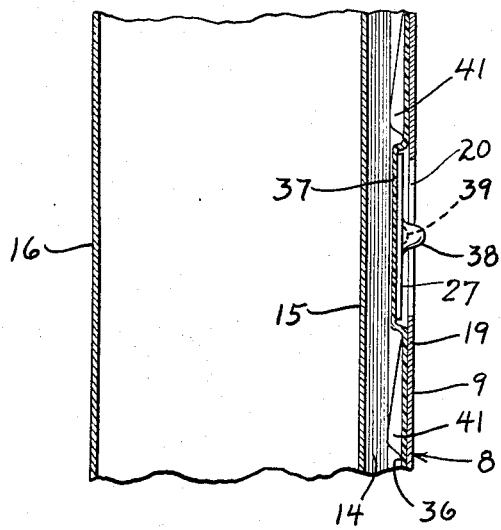
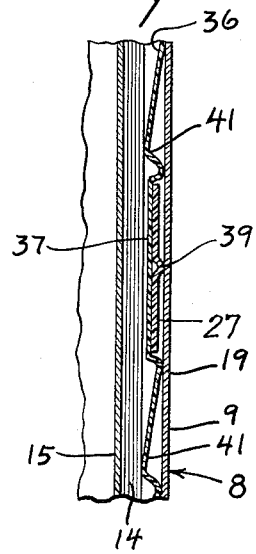
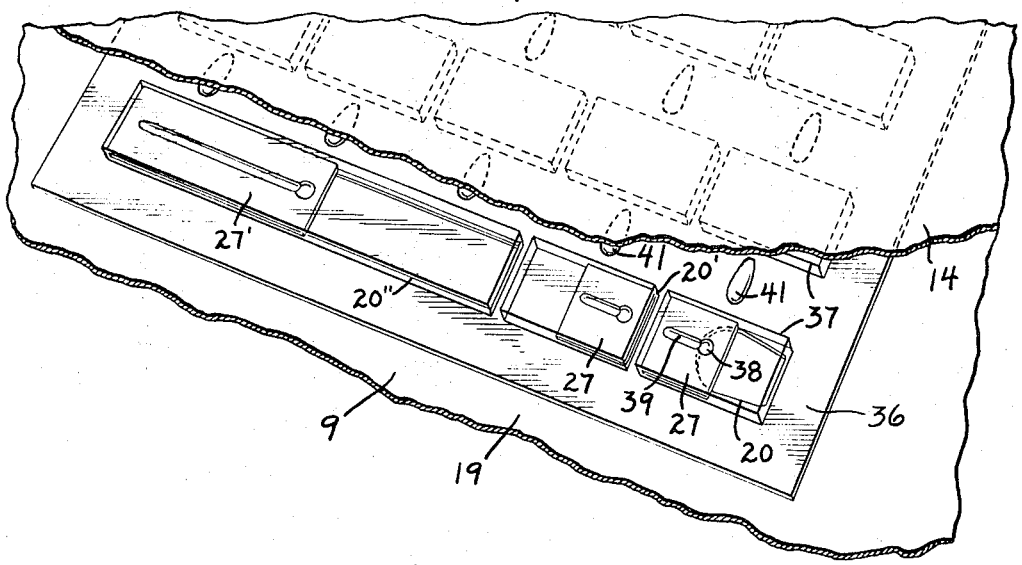
Inventor
Joseph E. White
Attorney

United States Patent Office 3,371,431
Patented Mar. 5, 1968

3,371,431
VOCABULARY AND SPELLING GAME DEVICE
Joseph E. White, 1330 Boilvin Ave.,
Rockford, Ill. 61103
Filed Feb. 25, 1965, Ser. No. 435,122
10 Claims. (Cl. 35—9)

ABSTRACT OF THE DISCLOSURE

A word game having a front panel with a series of windows having slidable closures, each window having a letter of the alphabet associated therewith; a sheet receivable behind the panel and having an array of numbers thereon so arranged as to be visible through certain of the windows; the letters associated with these certain windows, when arranged in the order indicated by the visible numbers, form a word which agrees with a word definition given the user as his initial starting step. The sheet behind the panel is square and has four different arrays of numbers on each side at 90° intervals with respect to one another, so that the one sheet can be used in eight different positions, four for each side, for eight different words.

---

This invention relates to a word game device related to that inclosed in Withers Reissue Patent 24,409, the present invention being particularly concerned with various improvements which were needed to make this game device commercially successful, these improvements, briefly stated, including the following:

(1) A square box-like container provides in the front wall rows of window openings, one for each letter of the alphabet, with the windows marked in alphabetical order, each window including a slide closure that is normally in closed position but adapted to be slid open to make visible a back sheet disposed behind these window openings inside the box on which numbers are printed in a predetermined relation to the windows regarding the location of letters in a word, each slide having a projecting knob to facilitate the operation thereof and also having a projecting elongated longitudinally extending rib which by frictional engagement with the back of the wall alongside the window opening frictionally holds the slide in open position when opened, the full length of the rib being disposed in the window opening in the closed position of the slide to insure its remaining closed until it is operated manually to open position;

(2) A sheet of transparent plastic material applied to the inside of the front wall has box-like guides embossed therefrom, one for each window opening, to house and retain the slides, thus making for a cheap and yet highly serviceable construction and one that will retain its good appearance indefinitely, the back sheet on which indicia are applied in a predetermined relationship to the window openings being clearly visible through the plastic material when the slides are pushed open;

(3) Further improvements on the box are (a) the provision of a window labeled "PAR," behind which a number appearing on the back sheet indicates the number of guesses considered par for a given word, and (b) another and much larger window labeled "DEFINITION" in which one can read what is printed on the backing sheet as a clue to the word the letters of which are to be guessed, both of these window openings having slide closures therefor operable in the same fashion as the others, so that, after a player determines by a certain number of guesses what the word is the player can check his number of guesses with what is considered "par" for that word to see whether he is below or above par, and, so far as the "definition" window is concerned, that may or may not be opened by a given player, depending on whether the player desires or requires a clue, experienced players being reluctant to use a clue, that being a reflection upon their ability, and (4) The back sheets are all square and each is arranged to be used in four positions for each side, each sheet having imprinted thereon, on both sides, numbers in four arrays, for eight plays on eight different words, each set of five numbers (1–5 for a 5-letter word) being printed in a predetermined relation to the location of the windows to indicate the place of the different letters in the word, and, related to each array of these numbers, will, of course, be another number pertinent to "par" for the given word, and also a definition pertinent to the word, the par being visible through the window marked "par," and the definition being visible through the window marked "definition," this feature being considered the most important improvement because it makes available eight plays for eight different words without any appreciable additional cost over what would be involved for one play.

The invention is illustrated in the accompanying drawings, in which

FIG. 1 is a face view of a word game device embodying the improvements of my invention, five slides being shown opened indicating the word "DRIFT" as the word that was to be guessed, the number 11 in the "par" window indicating that eleven guesses is considered par for that word, and the definition "TO FLOAT," appearing in the "definition" window serving as a clue;

FIG. 2 is a face view of a plurality of backing sheets usable one at a time behind the windows in FIG. 1, the uppermost one corresponding to the one in use in FIG. 1, this view serving to illustrate graphically the right angle relationship to one another of the four sets of numbers as well as the relationship of each of the four sets of numbers to a definition and a par figure, one corner of the top backing sheet being turned back to indicate similar printing on the back for four other words, so that one sheet serves for playing eight words, four on each side, with the sheet turned through 90 degrees from one setting to the next;

FIG. 3 is an enlarged view of a portion of FIG. 1 serving to better illustrate the windows and slides and the arrangement of the slides with respect to the embossed portions of the sheet of transparent plastic material applied to the inside of the front wall of the box, this view serving also to show how the duplication of a letter in a word is indicated with two numbers, as for "L" in the word "small," both 4 and 5 being shown in the one window under L;

FIG. 4 is a face view of a "magic slate" which is usually provided with the game on which to print the words as they are guessed, and also keep track of the number of guesses per word, if a score is being kept, corner portions of the clear plastic cover sheet and under-sheet being indicated as turned back from the bottom card on which a special pressure sensitive writing compound is provided for writing as with a reversed carbon paper on the back of the under sheet and be readable through the clear plastic cover sheet, these sheets being adapted to be stripped back off the card after what has been printed or written is to be "erased," making the slate ready for use again;

FIGS. 5 and 6 are enlarged sectional details taken along the correspondingly numbered lines in FIG. 3, showing the parts substantially double in size, and FIG. 7 is a perspective view looking at the back of the front wall of the box to better illustrate the embossed rectangular portions of the sheet of transparent plastic material and show their relationship both to the slidable closures for the windows and also the relationship of these portions and the embossed tear-drop shaped portions therebetween to the backing sheet that is uppermost in the stack during the guessing of a word as in FIG. 1.

The same reference numerals are applied to corresponding parts throughout the views.

Referring to the drawings, the reference numeral 8 designates the word game device of my invention generally, which comprises a box-like container, preferably of cardboard construction, and preferably square, consisting of a cover 9 which has only three side walls 10, 11, 12, the other side of the cover being left open, as indicated at 13, to give easy excess to the stack of backing sheets 14 which rests on a cardboard filler 15 disposed in the bottom half 16 of the box 8. The cover 9 has its three sidewalls, 10, 11, 12, glued to the corresponding side walls of the bottom half 16 of the box, the other side wall 17 of the bottom half being of less heighth than the first mentioned side walls, as seen in FIG. 1, and level with the top of the filler 15 so that a stack of backing sheets 14 can be stored in the box and be pulled out and replaced as a group with at least the top sheet 14 turned through ninety degrees after one word has been played to make ready for play on another word, or the same procedure can be followed pulling only the top sheet 14 out. In either event, the cutout 18 in the forward edge of the front wall 19 of the cover 9 facilitates the handling of these sheets. Usually two dozen backing sheets 14 are supplied in each unit. With eight words per sheet, as previously indicated, and as hereinafter more fully described, it is obvious that one unit provides for the playing of 192 words, there being eight words per sheet, four on each side. One of these sheets is seen in FIG. 2, the five numbers 1–5 that are visible through the windows 20 in the front wall 19 in FIG. 1 being all numbered 21. Three other arrays of numbers 1–5 disposed in right angle relationship to one another and to the array of numbers 21 also appear in FIG. 2. Thus, there is one array marked 22, at ninety degrees advanced from the array 21, another array 23 one-hundred-eighty degrees advanced from array 21, and a third array 24 two-hundred-seventy degrees advanced from the array 21. Similar arrays of numerals for four other words are provided on the other side of the sheet, as indicated at 25 on one corner portion of sheet 14 that is folded back for purposes of better illustration. There are twenty-six windows 20 in the front wall 19, one for each of the letters of the alphabet, each window having above it as a caption the letter for that window, as indicated at 26 in FIG. 1, and when the slides 27, which form closures for the windows, are slid back to open position, as indicated for the letters D-R-I-F-T, the numbers 1–5 on the back sheet 14 are visible through the windows and indicate to the player the position of each letter in a five letter word, D being 1, R being 2, I being 3, F being 4, and T being 5. A recorder for keeping a record of the letters as they are guessed, in their indicated order, may be furnished. If a magic slate, like that shown at 28 in FIG. 4, is provided with the game, having a clear plastic top sheet 29 imprinted with the columns 30 and captions numbers 1–5, as shown at 31, it is a simple matter in playing the game to write each letter in the appropriate column as it is guessed correctly. Two or three guesses are allowed for each letter of the five-letter word Drift, as indicated by the placing of a par of 11 for this word, as shown at 32, visible through another window opening 20'. The caption "PAR" appears over the window 20', as seen at 33 in FIG. 1, and a slide closure 27 is provided for this window, the same as for the windows 20 for the alphabet.

The player usually opens the window 20' after guessing all of the letters in a given word and totalling up his score on that word, so as to compare his score with par. Of course, this determination of par could just as well precede the guessing of the five letters. It is up to the player; some prefer to know what is par before starting, and others prefer to see if they have broken par afterward. Next to the window 20' is a much longer one 20' with the caption "DEFINITION" above it, as indicated at 34 in FIG. 1, and when the slidable closure 27' provided in this window is slid open, the definition for the word to be guessed is seen, as at 35 in FIG. 1, the same being printed on the back sheet 14 near the par numeral 11, as seen in FIG. 2. Here again, some players prefer to try to guess what the word is without a clue of any kind other than from the determination of one or two letters picked either by chance at the outset or by using the vowel letters a, e, i, o, u, and y as a basis of guessing at least the first one, two, or three letters of a five-letter word. In passing, it should be obvious that one need not use a magic slate 28 in jotting down the letters of a word as they are guessed one after another, because any piece of paper that is handy could be used. The main advantage with a magic slate 28 is that the undersheet 36 cooperates with the special pressure sensitive material on the top face of the bottom card B to make letters appear on the back of sheet 36 the same as when carbon paper is inverted under a paper in writing thereon, and, after the sheet has been filled with words (four being shown in FIG. 4, corresponding to the four words covered by the four arrays of numbers 1–5 on the back sheet 14 in FIG. 2) it is a simple matter for the player to strip the top two sheets 29 and 36 from the bottom card B to "erase" what has been written and make the plate ready for the next writing of other words. The player's name is inserted at N and his score at S, and, when the slate is cleared, a new player's name can, of course, be entered at 38 at the start of a new game.

A sheet of transparent plastic material 36 is applied to the inside of the front wall 19 of the box and has embossed therefrom rectangular box-like portions 37, one for each of the window openings 20, 20' and 20'', to house and retain the slides 27 and 27' previously mentioned, thereby making for a cheap and yet highly serviceable construction and one that will retain its good appearance indefinitely, while at the same time making the back sheets 14 disposed behind these embossed portions 37 clearly visible through the plastic material when the slides are pushed open, so that the player can easily read the numbers 21 to indicate the presence of the different letters and their location in a five letter word, as well as the numeral at 32 that indicates the "par" for a given word, and the definition 35 for each word. The slides 27 and 27' are preferably molded of opaque plastic material, each with an embossed knob 38 to serve as a handle or abutment for the player's finger nail in opening the windows. These slides each have an embossed rib 39 provided thereon extending from the knob longitudinally of the slide and just long enough to have sufficient abutment with the side of the window opening 20, 20', or 20'', as seen at 40 in FIG. 3, to hold the slide releasably in closed position until it is opened by the player applying lateral pressure on the knob 38 in the direction of the rib 39, namely, from left to right as seen in FIG. 3. Thereafter, the rib 39 which has thus been forced behind the front wall 19 has sufficient line contact with the back of the wall 19 alongside the window opening to retain the slide frictionally in the opened position, as seen at the right in FIG. 3, so the rib 39 really serves two purposes, as much to hold the slide in open position as in closed position. The tear-drop shaped bosses 41 that are embossed on the sheet 36 in rows between the rows of embossed rectangular guide portions 37 are purposely made a trifle larger in the dimension at right angles to wall 19 than the guides in 37, as clearly appears in FIGS. 5 and 6, so that they have point contact with and space the topmost back sheet 14 slightly with respect to the guides 37 and accordingly make for much easier sliding of the back-sheets 14 in or out, besides serving to deflect the edge portion of a backing sheet 14 out of abutment with one side of the guides 37 so as to make the insertion of the sheet to playing position much easier.

In operation, when the player starts, all of the slides 27 and 27' are closed and all that the player knows is that he is to guess what five-letter word is involved in a given setting of the back sheet 14. Assuming that the word is DRIFT and the player's first guess is the letter A, he opens the slide for that letter and finds only a blank in that window 20, indicating that there is no letter A in the word. Assuming he then tries the letter E, on the theory that the vowel letters *a, e, i, o, u,* and *y* most commonly occur, he again draws a blank, so he has had two guesses with nothing to show for them. However, on the third guess, assuming he opens the window for the letter I, he ascertains from seeing the numeral 3 there that it is the third letter in the word to be guessed. This is his first clue. Assuming now that he goes on and uses the other vowel letters, *o, u,* and *y,* he would, of course, draw blanks on those three letters also, thus having used six guesses and located only one letter I at the third place in the word. He then may check the par window to determine what is pair for the word, and would doubtlessly be somewhat alarmed to find that he had only five more guesses in which to get the other four letters. The chances are that in such a situation the average player would not score very well, and, under the circumstances, the player might be excused for then opening the slide for the window 20" to see if the definition for the word would be of any help. Perhaps with such assistance as that the player might be able to score a bit better but would still wind up above the par of eleven. Of course, many players use other systems for guessing what letters are in a given word, and once they have ascertained two or three letters, they have less difficulty in finding out what the remaining letters are and can accordingly score below par or at least even par that way. Ingenuity, a good vocabulary, and a good knowledge of spelling are big factors. The fact that with each backing sheet 14 the player has eight words to guess, four on each side of the sheet, and need only turn the sheet through ninety degrees to change from one word to another, is a big advantage and reduces the cost of the word game device to a point where it can be sold at a good profit. The slides 27 and 27' are all closed after a word has been played to make ready for the next word.

It is believed the foregoing description conveys a good understanding of the objects and advantages of my invention. The appended claims have been drawn to cover all legitimate modifications and adaptations.

I claim:

1. A device of the class described comprising a container member having a front wall in which window openings are provided, one for each letter of the alphabet, the windows being designated by these letters and arranged in alphabetical order, openable closures for said windows, a backing sheet removably mounted in said member behind said front wall, portions of which are visible through said window openings when the closures are opened, and a plurality of arrays of numbers arranged, on a surface of said backing sheet, each array having its numbers all oriented uprightly with respect to one edge of said backing sheet, and so positioned relative to each other as to be simultaneously aligned with and visible through some of the windows when opened and designating by their appearance in certain windows the letters identified with said certain windows and the order of said last mentioned letters identified with those windows in a word to be guessed, said backing sheet having such numbers in different arrays for different words, and said backing sheet being movable from one operative position to another to make use of a different array of numbers for each of a plurality of different words.

2. A device as set forth in claim 1 wherein said backing sheet has numbers on the back for the same purpose as the numbers on the front, said sheet being reversible to make available for use the numbers on the back similarly as the ones on the front.

3. A device as set forth in claim 1 wherein the backing sheet is substantially square and is arranged to be turned from one operative position through 90° to each of three other operative positions, in each of which the numbers are visible only through certain windows when opened to designate the order of certain letters identified with those windows in a word to be guessed.

4. A device as set forth in claim 3 wherein said backing sheet has numbers on the back for the same purpose as the numbers on the front, said sheet being reversible to make available for use the numbers on the back similarly as the ones on the front, whereby to make the one sheet serve for eight different words to be guessed, four words per side.

5. A device as set forth in claim 1 including another window opening in said front wall with a caption pertaining to par with reference to the number of guesses allowed for guessing what letters occur in a word to be guessed, the backing sheet bearing par numbers for different words visible through said window when opened, and a closure for said opening.

6. A device as set forth in claim 1 including another window opening in said front wall with a caption pertaining to the definition of a word to be guesed, the backing sheet bearing definitions for different words visible through said window when opened, and a closure for said opening.

7. A device of the class described comprising a generally rectangular box having an open end behind a front wall, there being window openings provided in said front wall, one for each letter of the alphabet, the windows being designated by these letters and arranged in alphabetical order, openable closures for said windows, and a generally rectangular backing sheet slidable into and out of the box through the open end for positioning behind said front wall, portions of the backing sheet being visible through said windows when opened and certain of these portions bearing numbers designating by their appearance in certain windows the order of certain letters identified with those windows in a word to be guessed, the sheet being removable and turnable from one operative position for one word to another for another word, there being numbers for each word, the backing sheet being substantially square and arranged to be turned from one operative position through 90° to each of three other operative positions in each of which the numbers are visible only through certain windows when opened to designate the order of certain letters identified with those windows in a word to be guessed.

8. A device as set forth in claim 7, wherein said backing sheet has numbers on the back for the same purpose as the numbers on the front, said sheet being reversible to make available for use the numbers on the back similarly as the ones on the front, whereby to make the one sheet serve for eight different words to be guessed, four words per side.

9. Apparatus for playing a word game, comprising a member having a plurality of openings therein and being disposed in a pattern, a plurality of closures separately movably mounted on said member for selective opening and closing of said openings, said member having letters of the alphabet printed thereon adjacent each one of said openings and corresponding thereto, said member at least partly defining a square-shaped pocket disposed in a position to be internally visible through said openings and eccentric with respect to said pattern of said openings, a square-shaped sheet removably disposed in said pocket and having four sets of printed numbers on each side of said sheet and each of said four sets on a given side of said sheet being oriented and spaced with respect to a different edge of said sheet so as to come in mutually exclusive alignment with certain of said openings to be visible through said openings in accordance with the orientation of said sheet in said pocket and with each of said sets of said printed numbers and said printed letters on said member being related to designate a word upon movement of said closures to expose said printed numbers one said sheet, and a recorder having numbered spaces thereon numbered in accordance with said numbers on said sheet for recording said letters in said numbered spaces upon a player's selective exposure of said numbers through said openings.

10. Apparatus for playing a word game, comprising a member having a plurality of openings therein and being disposed in a pattern, a plurality of closures separately movably mounted on said member for selective opening and closing of said openings, said member having letters of the alphabet printed thereon adjacent each one of said openings and corresponding thereto, said member at least partly defining a square-shaped pocket disposed in a position to be internally visible through said openings and eccentric with respect to said pattern of said openings, and a square-shaped sheet removably disposed in said pocket and having four sets of printed numbers on each side of said sheet and each of said four sets on a given side of said sheet being oriented and spaced with respect to a different edge of said sheet so as to come in mutually exclusive alignment with certain of said openings to be visible through said openings in accordance with the orientation of said sheet in said pocket and with each of said sets of said printed numbers and said printed letters on said member being related to designate a word upon movement of said closures to expose said printed numbers on said sheet.

References Cited

UNITED STATES PATENTS

| | | | |
|---|---|---|---|
| 2,193,745 | 3/1940 | Sterwe | 35—8 |
| 2,628,435 | 2/1953 | Minninger et al. | 35—35 |
| 2,681,804 | 6/1954 | Stover | 35—35 |
| 2,684,853 | 7/1954 | Withers | 273—135 |
| 2,733,067 | 1/1956 | Moore et al. | 273—135 |
| 3,014,727 | 12/1961 | Myers | 273—135 |
| 3,096,092 | 7/1963 | Bredehorn | 273—135 |

FOREIGN PATENTS 793,156  4/1958  Great Britain.

F. BARRY SHAY, *Primary Examiner.*